US 7,471,715 B2

(12) United States Patent
Sudo et al.

(10) Patent No.: US 7,471,715 B2
(45) Date of Patent: Dec. 30, 2008

(54) RECEIVER FOR RECEIVING A SPECTRUM DISPERSION SIGNAL

(75) Inventors: Shigeyuki Sudo, Yokohama (JP); Osamu Hasegawa, Hitachinaka (JP); Toshiya Eguchi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/907,423

(22) Filed: Oct. 12, 2007

(65) Prior Publication Data

US 2008/0049815 A1 Feb. 28, 2008

Related U.S. Application Data

(63) Continuation of application No. 11/808,607, filed on Jun. 12, 2007, which is a continuation of application No. 11/054,439, filed on Feb. 10, 2005, now Pat. No. 7,269,203, which is a continuation of application No. 10/026,798, filed on Dec. 27, 2001, now Pat. No. 7,035,309, which is a continuation of application No. 09/277,164, filed on Mar. 26, 1999, now Pat. No. 6,363,101.

(30) Foreign Application Priority Data

Mar. 31, 1998 (JP) ................ 10-085485

(51) Int. Cl.
*H04L 27/00* (2006.01)
(52) U.S. Cl. ............ 375/147; 375/354; 455/343.2; 455/574; 370/311; 370/503; 713/324
(58) Field of Classification Search ............ 375/130, 375/147, 153, 354; 370/311, 318, 335, 503; 455/425, 574, 343.2; 713/320, 324, 500, 713/502
See application file for complete search history.

(56) References Cited

U.S. PATENT DOCUMENTS 5,566,213 A 10/1996 Carsello (Continued)

FOREIGN PATENT DOCUMENTS

EP 08-51593 7/1998

(Continued)

OTHER PUBLICATIONS

S. Chang, "A New Serial Search Acquistion Approach with Automatic Decision Threshold Control", IEEE 45th, Vehicular Technology Conference, vol. 2, Jul. 25-28, 1995, pp. 530-536.

(Continued)

*Primary Examiner*—Dac V Ha
(74) *Attorney, Agent, or Firm*—Mattingly, Stanger Malur & Brundidge, P.C.

(57) ABSTRACT

A receiver for the CDMA system which reduces power consumption during a suspension period of intermittent receiving operation by monitoring a suspension period by a low-power timer so that a VC-TCXO, reference signal group generation and receiving units are turned off and a modem unit is set to a sleep state. Upon resumption of receiving operation, a high-accuracy timer is started to count a time period and part of a received signal is stored. A PN code phase of stored data is calculated during the time period to obtain an indication value for phase deviation. State vectors for short and long codes and a further reception time are calculated based on the indication value. When the high-accuracy timer counts the time period and produces 0V(d), demodulation operation by a rake demodulation, demultiplexing, and descrambler units is started and is continued during the reception time.

2 Claims, 12 Drawing Sheets

U.S. PATENT DOCUMENTS

| | | | |
|---|---|---|---|
| 5,642,377 A | 6/1997 | Chung et al. | |
| 5,708,658 A | 1/1998 | Sugita | 370/335 |
| 5,737,323 A | 4/1998 | Lansdowne | |
| 5,781,543 A | 7/1998 | Ault et al. | |
| 5,842,141 A | 11/1998 | Vaihoja et al. | 455/574 |
| 5,943,613 A | 8/1999 | Wendelrup et al. | |
| 5,950,131 A | 9/1999 | Vilmur | |
| 5,974,038 A | 10/1999 | Shou et al. | 370/335 |
| 5,987,339 A | 11/1999 | Asano | |
| 6,016,312 A | 1/2000 | Storm et al. | 370/311 |
| 6,058,289 A * | 5/2000 | Gardner et al. | 340/7.32 |
| 6,073,035 A | 6/2000 | Witter | |
| 6,088,602 A | 7/2000 | Banister | 455/574 |
| 6,144,649 A | 11/2000 | Storm et al. | |
| 6,212,398 B1 * | 4/2001 | Roberts et al. | 455/502 |
| 6,363,101 B1 | 3/2002 | Sudo | |
| 6,480,476 B1 * | 11/2002 | Willars | 370/311 |
| 7,035,309 B2 | 4/2006 | Sudo et al. | |

FOREIGN PATENT DOCUMENTS

| | | |
|---|---|---|
| JP | 5-191375 | 7/1993 |
| JP | 08-251656 | 9/1996 |
| JP | 8-321804 | 12/1996 |
| JP | 9-233020 | 9/1997 |
| JP | 9-321667 | 12/1997 |
| JP | 10-190568 | 7/1998 |
| JP | 10-200507 | 7/1998 |

OTHER PUBLICATIONS

Y. H. You, et al., "Parallel Code Acquisition Technique for Preamble Search in the CDMA Reverse Link", Electronics Letters, Jun. 20, 1996, vol. 32, No. 13, pp. 1169-1170.

* cited by examiner

AT SHORT CODE : 15×15 MATRIX

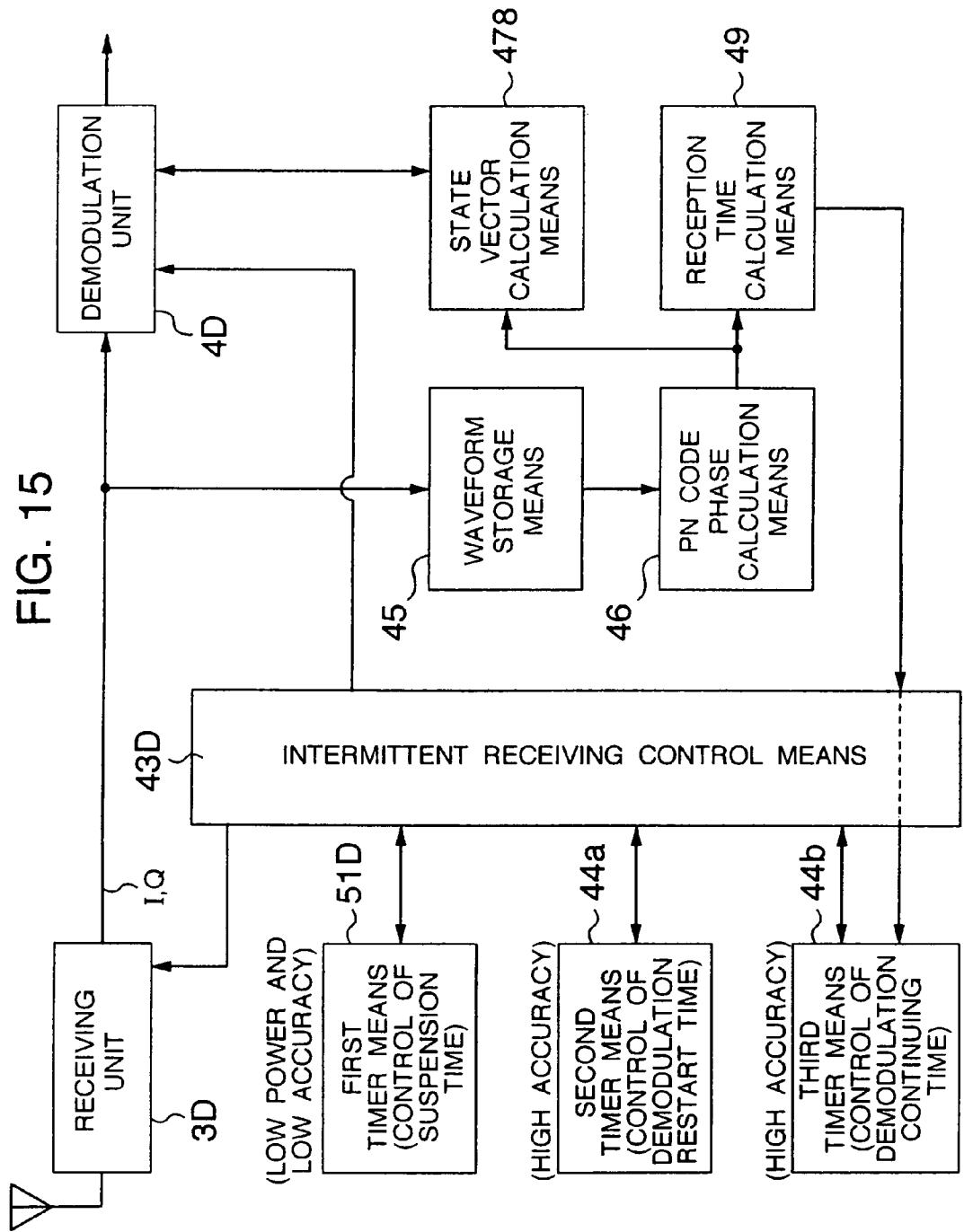

RECEIVER FOR RECEIVING A SPECTRUM DISPERSION SIGNAL

The present application is a continuation of application Ser. No. 11/808,607, filed Jun. 12, 2007, which is a continuation of application Ser. No. 11/054,439, filed Feb. 10, 2005; now U.S. Pat. No. 7,269,203, which is a continuation of application Ser. No. 10/026,798, filed Dec. 27, 2001, now U.S. Pat. No. 7,035,309; which is a continuation of application Ser. No. 09/277,164, filed Mar. 26, 1999, now U.S. Pat. No. 6,363,101, the contents of which are incorporated herein by reference.

BACKGROUND OF THE INVENTION

The present invention relates to a receiver mounted in a terminal used in a mobile communication system, and more particularly a receiver for receiving a spread spectrum signal and suitable for the terminal performing the intermittent receiving operation in the mobile communication system of the code division multiple access (CDMA) system.

In the terminal used in the mobile communication system and represented by a portable telephone, it is important to suppress the power consumption and extend the service time that the terminal can be operated. Accordingly, when the terminal is in the idle state, the terminal performs the intermittent receiving operation. In the intermittent receiving operation, the receiving and demodulation operation is made for the paging channel produced in the time division manner only during a time slot assigned thereto, and the receiving operation is suspended during sections of time slots not assigned thereto. During the suspension of the receiving operation, a power supply for unnecessary circuits is cut off and/or a processor is moved to a low-power consumption mode, so that the power consumption of the terminal is reduced.

In the portable telephone system of the CDMA system utilizing the spectrum spreading, the intermittent receiving operation named a slot mode is prescribed. In this case, the terminal is required to maintain synchronization of the PN (Pseud Noise) code during suspension of the receiving operation or attain high-speed re-synchronization upon resumption of the receiving operation. The requirement is to make the despreading using the replica PN code produced in the terminal upon demodulation of a received signal. This point is now described in detail.

FIG. 14 schematically illustrates a transmitter of a base station. This drawing is depicted to pay attention to the paging channel (PaCH) for the paging important to the intermittent receiving operation. A coded paging message is inputted as a data string to one input of an exclusive-OR gate (BS1). The other input of the gate is supplied with an output signal of a decimeter (BS2) which decimates an output signal of a PN-code-for-long-code generator (BS3) to the symbol rate of the data string. The code of the PN-code-for-long-code generator (BS3) has a period of $2^{42}$-1 and a phase of code can be adjusted by a long-code mask bit. An output signal of the exclusive-OR gate (BS1) is changed to a scrambled paging message by the very long code series. In order to multiplex the scrambled symbol by a signal of another channel having a different function, the scrambled symbol is subjected to the spreading by orthogonal sequences in an exclusive-OR gate (BS4). The input symbol is spread to 64 chips by means of a series assigned to the paging channel of 64 kinds of orthogonal series named the Walsh function (BS5). The orthogonally spread output of the exclusive-OR gate (BS4) is multiplexed together with other pilot channel (PiCH), synchronization channel (SCH) and traffic channel (TCH) in a multiplexer circuit (BS6). Actually, binary codes are substituted with pulses having the bipolarity of 1 and −1 and are multiplied by a gain based on the power distribution of channels to be added. The multiplexed output signal of the multiplexer is separated into the I-signal and the Q-signal to be supplied to multipliers (BS7 and BS9), respectively. The multipliers (BS7 and BS9) are connected to different PN code generators including an I-channel pilot PN code generator (BS 8) and a Q-channel pilot PN code generator (BS10). Accordingly, I- and Q-signals of two-phase modulation signals are spread to four-phase modulation signals by two different series. The PN code used in the four-phase spreading is a series having a period of $2^{15}$ named a short code. The four-phase spreading signals are supplied to baseband filters BS11 and BS12 in which the bandwidth thereof is restricted and are carrier-modulated by an quadrature modulator BS13 to be outputted. The foregoing is operation made by the base station. The long-code PN code generator (BS3) for scrambling and the I-channel and Q-channel pilot PN code generators (BS8, BS10) for 4-phase spreading are continuously operated irrespective of the structure of the slot for the paging channel time-divided by paging groups.

The terminal for receiving the signal obtains I- and Q-signals of the spread band by means of quadrature detection. Then, the signals are subjected to despreading using the short codes for the I- and Q-signals. Naturally, the short codes used in the terminal require the series synchronized with the base station. Since the short codes for spreading in the base station are produced continuously when the intermittent receiving operation is performed, it is necessary that the PN code generating means in the terminal is continuously operated apparently. In this case, the synchronization is maintained even during the suspension period of the intermittent receiving operation. Alternatively, even if the synchronization is not once maintained during the suspension period, there is no problem when the synchronization is made again before arrival of the assigned slot. However, the period of the short code is $2^{15}$ and accordingly since new search for all of the phase space upon resumption of the receiving operation increases the receiving time rate of the intermittent receiving operation, it is not desirable. Hence, in order to enhance the effect of suppressing the power consumption in the intermittent receiving operation, the inventions described in JP-A-5-191375 and JP-A-8-321804 have been made.

In the former example, when the receiving operation is changed to the suspension state, a fixed frequency oscillation circuit is connected to a local spreading code generation circuit to drive the generation circuit by a free-running clock of the oscillation circuit, so that a phase difference is prevented from being increased. While a phase of the local spreading code delayed by a shift or deviation of a phase anticipated in the suspension time upon the resumption of the receiving operation is made progress gradually, the correlation peak is detected to make re-synchronization. In the invention, the local spreading code generation circuit is freely operated by itself during the suspension period and the power supply thereto cannot be cut off.

On the contrary, in the latter example, a state value of spreading code generation means at the time of next starting is set to register means to operate timer means. Upon re-starting due to time out of the timer means, the spreading code generation means is operated from the state value set in the register means. In this case, the power supply to the receiving circuit including the spreading code generation means can be cut off during the suspension period. However, in order to ensure that the expected state value is correct upon re-starting, the accuracy of timing by the timer means for controlling the suspension period is important. For example, when it is assumed that the suspension period is about several seconds and the chip rate of code is several mega chips per second, the timing accuracy of about one tens millionth is required in order not to produce any shift or deviation by one chip. As a reference oscillator used in the portable telephone, there is a voltage-controlled type temperature compensation crystal oscillator (hereinafter, abbreviated as VC-TCXO) and the VC-TCXO having the absolute accuracy of about 2.0 ppm is selected in view of the cost condition. In addition thereto, the frequency control referring to the received signal from the base station is performed, so that the timing accuracy required for the timer means can be obtained. That is, in the prior art of the latter example, it is required that the oscillator circuit of the high accuracy as the VC-TCXO is operated during the suspension period.

The current to be consumed in the VC-TCXO is, for example, about 1 µA and is larger than several µA of an IC for watch having an inferior accuracy thereto.

SUMMARY OF THE INVENTION

The subject to be solved by the present invention is to suspend despreading code generating means and a high-accuracy oscillator circuit (for example, VC-TCXO) which is a reference of timer means, both of which cannot be suspended in the prior art during the suspension period of the intermittent receiving operation. Thus, the average power consumption of the receiver for the terminal used in the mobile communication system of the CDMA system is more reduced.

In order to achieve the above object, a receiver for receiving a spread spectrum signal and including means for generating a code for despreading, comprises first timer means started when a receiving state is changed to a suspension state, second timer means started when receiving operation is resumed from the suspension state and for counting a length of time A, storage means for storing a received signal of a predetermined length in the form of digital data, code phase calculation means for calculating a phase of spreading code relative to the received signal stored in the storage means, state vector calculation means for calculating a state vector of the code generating means corresponding to a code phase after an elapse of time corresponding to the length of time A on the basis of the calculated phase of spreading code, and intermittent receiving control means for controlling to start counting of the second timer means when the storage means starts storage operation and to cause the code generating means to start operation thereof on the basis of the calculated result of the state vector calculation means when the second timer means is overflowed.

Further, the receiver comprises reception time calculation means for calculating a length of reception time B containing a slot period of a paging channel to be received from the time that the second timer means is overflowed and to which a predetermined receiving processing time is added, on the basis of the calculated code phase, and third timer means to which any length of time to be counted can be set.

The intermittent receiving control means includes means for setting the length of time B calculated by the reception time calculation means to the third timer means when the second timer means is overflowed to start counting of the third timer means and starting the first timer means when the third timer means is overflowed.

According to the present invention, free-running operation during the suspension period of despreading code generation means or a high-accuracy oscillation circuit for managing the suspension period, which is required in intermittent receiving operation of the CDMA system in the prior art, is not necessary.

According to the present invention, the suspension period is controlled or managed by timer means having inferior accuracy. Upon resumption of receiving operation, a PN code phase of a received signal is calculated and a state vector of a PN code generator after a predetermined time is set on the basis of the calculated value. An elapse of the predetermined time is managed by a newly started high-accuracy timer means to perform re-synchronization. Further, in order to calculate the state vector in a short time, the reception time is adjusted every time on the basis of the calculated value with respect to variation of the suspension period, so that a deviation of phase code upon resumption of receiving operation is limited within an expected range.

As a result, a reference oscillation circuit with high accuracy used in a receiving circuit and a terminal in the mobile communication system can be suspended during the suspension period of the intermittent receiving operation except the timer means with inferior accuracy.

Since a low-power device can be selected as the timer means with inferior timing accuracy, the power consumption during the suspension period of the intermittent receiving operation can be more reduced.

BRIEF DESCRIPTION OF THE DRAWINGS

FIG. 15 is a schematic diagram illustrating a basic principle of the present invention.

DETAILED DESCRIPTION OF THE EMBODIMENTS

Figure 1:
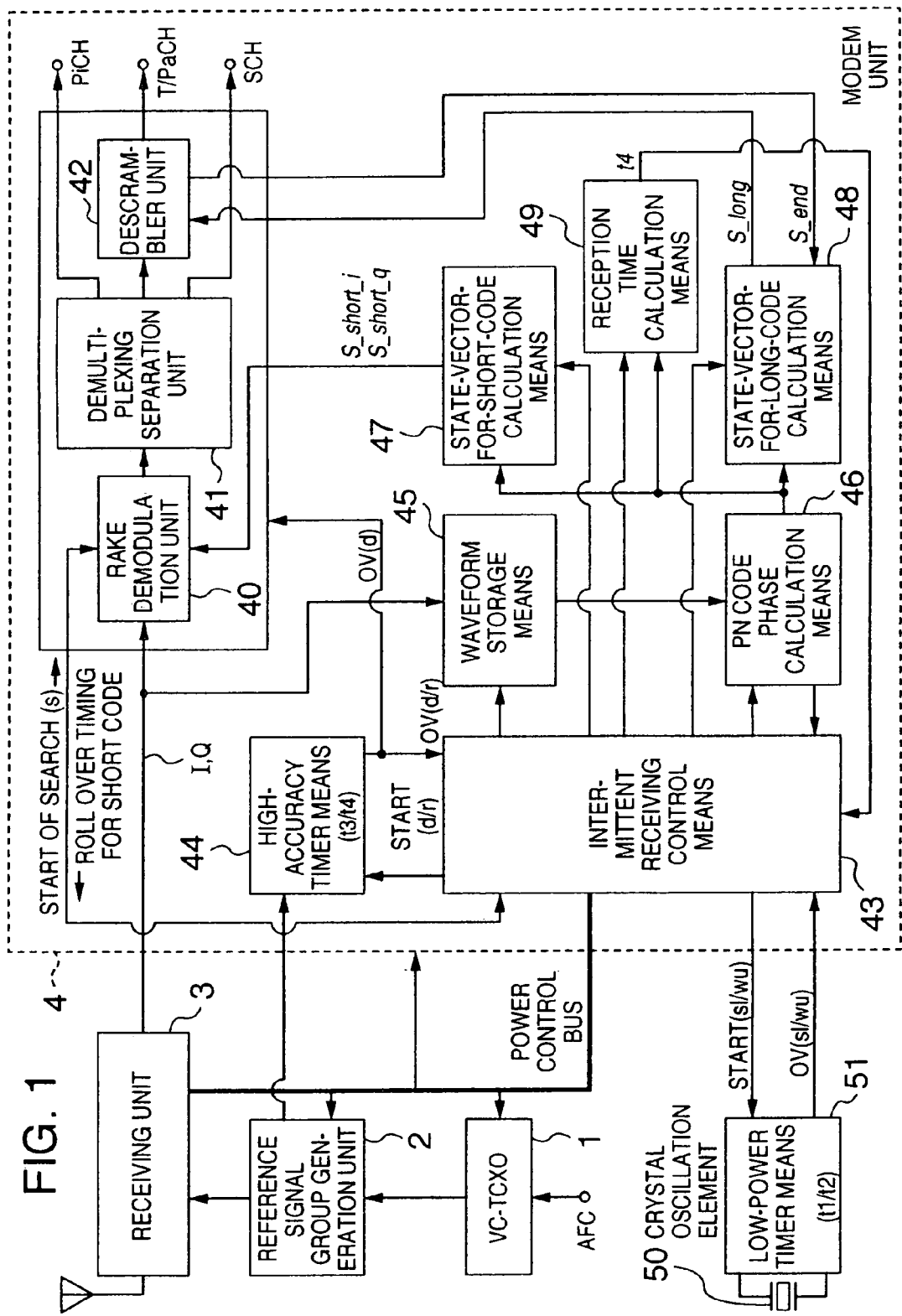
FIG. 1 is a schematic diagram illustrating a receiver according to an embodiment of the present invention.

Embodiments of the present invention are now described with reference to the accompanying drawings. FIG. 1 is a schematic diagram illustrating a receiver of an embodiment. In FIG. 1, numeral 1 denotes a VC-TCXO, 2 a reference signal group generation unit, 3 a receiving unit, 4 a modem unit, 40 a rake demodulation unit, 41a demultiplexing unit, 42 a descrambler unit, 43 intermittent receiving control means, 44 high-accuracy timer means, 45 waveform storage means, 46 PN code phase calculation means, 47 state-vector-for-short-code calculation means, 48 state-vector-for-long-code calculation means, 49 reception time calculation means, 50 a crystal oscillation element, and 51 low-power timer means.

The embodiment is characterized by the provision of two timer means with different accuracy including the high-accuracy timer means 44 and the low-power timer means 51. The VC-TCXO 1 has the high stability and can correct or calibrate a frequency with reference to a frequency of the base station by means of control from an automatic frequency control (AFC) terminal. The signal from the VC-TCXO 1 is used as the reference signal and the reference signal group generation unit 2 supplies a local oscillation signal for frequency conversion to the receiving unit 3. Further, the reference signal group generation unit supplies a counting clock to the high-accuracy timer means 44. Accordingly, the high-accuracy timer means 44 can perform time control with the accuracy of the VC-TCXO 1. On the other hand, the low-power timer means 51 uses the crystal oscillation element 50 as an oscillation source and is characterized in that it operates with low power although the accuracy thereof is lower than that of the VC-TCXO 1.

In the embodiment, the suspension period of the receiving operation which occupies almost the idle time is controlled by the low-power timer means 51 to thereby save power and the high-accuracy timer means 44 which is suspended during the suspension period is used to control synchronization of the PN code. Detailed description thereof is made below.

First of all, a usual route of a received signal is described.

In the embodiment, a dispersion signal form the base station is received by the receiving unit 3 and quadrature detected I- and Q-signals of a spread band are inputted to the modem unit 4. In the modem unit 4, the I- and Q-signals are supplied to the rake demodulation unit 40 to be subjected to despreading and path diversity reception. In the path diversity reception, multi-path signals having different arrival time are separated in accordance with different phases of despreading and a plurality of separated multi-path signals are demodulated by a plurality of demodulation circuits named fingers so that skews of a plurality of demodulation outputs are adjusted to be combined. The path combined output of the rake demodulation unit 40 is supplied to the demultiplexing unit 41, in which the outputs of channels multiplexed by the orthogonal function are separated. Scrambled traffic channel (TCH) and paging channel (PaCH) are supplied to the descrambler unit 42 to be restored to codes which are not scrambled.

A particular configuration for performing the intermittent receiving operation is now described.

The power supply control for each portion in the embodiment is made by means of a power supply control bus connected to the intermitting receiving control means 43. The intermittent receiving control means 43 controls turning on and off of the power supplies to the VC-TCXO 1, the reference signal group generation unit 2 and the receiving unit 3 and active and sleep states of the modem unit 4. The control timing thereof is produced by the two timer means 44 and 51 and is controlled or managed by an overflow signal detected by the intermittent receiving control means 43. Further, the counting operation of the timer means 44 and 51 is started by the intermittent receiving control means 43. Two kinds of start signals including a start signal (d) and a start signal (r) are provided for the high-accuracy timer means 44. Two kinds of start signals including a start signal (s1) and a start signal (wu) are provided for the low-power timer means 51.

Furthermore, the intermittent receiving control means 43 controls re-synchronization processing of the PN code upon resumption of the receiving operation. The re-synchronization processing is made by controlling the waveform storage means 45, the PN code phase calculation means 46, the state-vector-for-short-code calculation means 47, the state-vector-for-long-code calculation means 48 and the reception time calculation means 49.

The connection relation of the above means is as follows:

The waveform storage means 45 is supplied with the orthogonally detected I- and Q-signals and stores the I- and Q-signals at the timing commanded by the intermittent receiving control means 43. The stored data are supplied to the PN code phase calculation means 46. The PN code phase calculation means 46 supplies an indication value i described later to the state-vector-for-short-code calculation means 47, the state-vector-for-long-code calculation means 48 and the reception time calculation means 49. The state-vector-for-short-code calculation means 47 supplies the calculated state vectors S_short_i and S_short_q to the rake demodulation unit 40. The state-vector-for-long-code calculation means 48 is supplied with a state vector S_end from the descrambler unit 42 and supplies a state vector S_long to the descrambler unit 42. Further, the reception time calculation means 49 supplies a calculated signal t4 to the intermittent receiving control means 43. The intermittent receiving control means 43 is supplied with an alarm from the PN code phase calculation means 46 and a roll over timing for short code from the rake demodulation unit 40 and further supplies a start signal (s) for a search operation to the rake demodulation unit 40. In addition, an overflow signal 0V (d) is supplied from the high-accuracy timer means 44 to the rake demodulation unit 40, the demultiplexing unit 41 and the descrambler unit 42 so as to instruct the beginning of the demodulation operation in the intermittent receiving mode.

The receiver of the embodiment is configured as described above. The operation thereof is now described.

Figure 2:
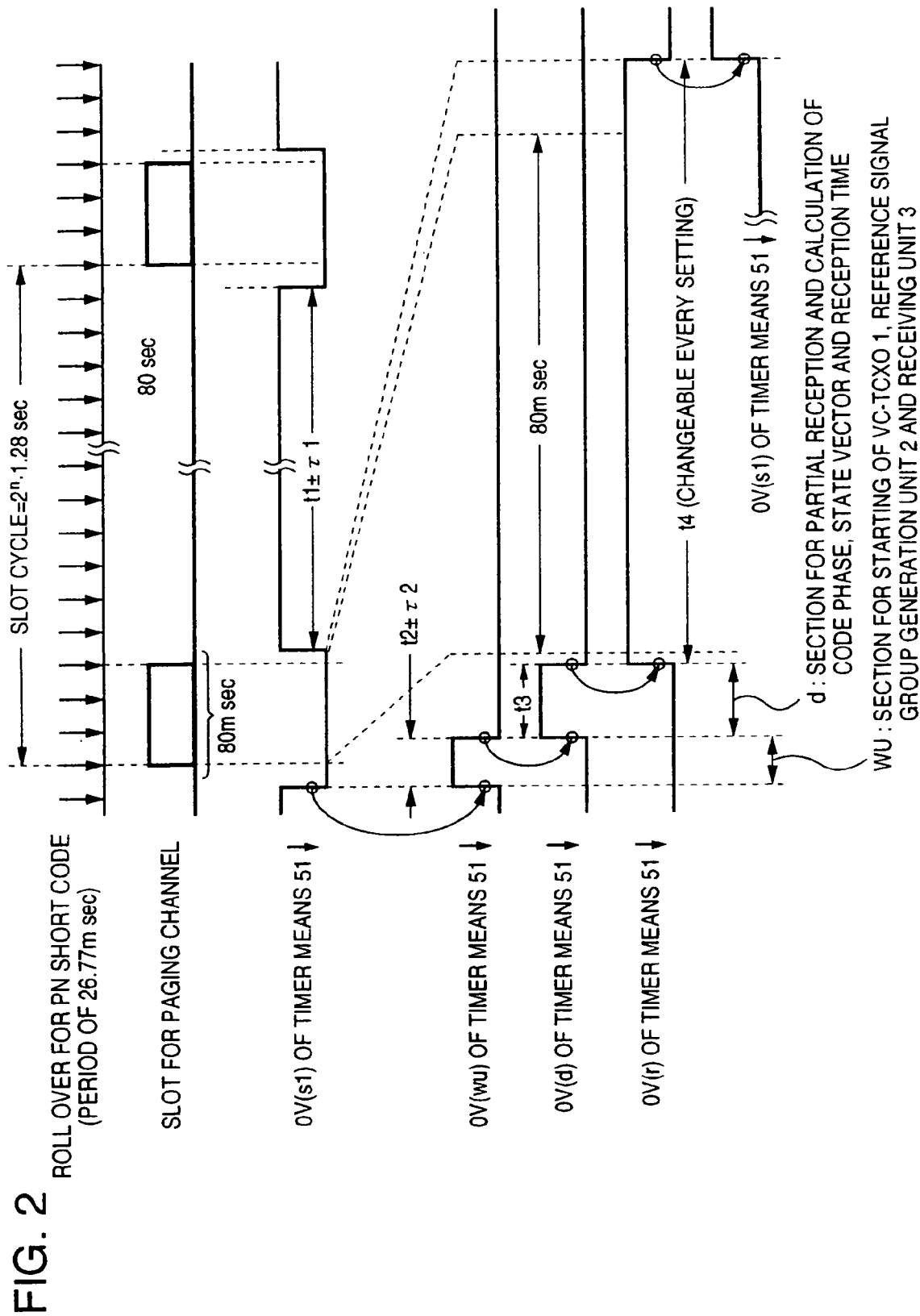
FIG. 2 is a diagram for explaining control timing for the intermittent receiving operation.

FIG. 2 is a diagram for explaining the intermittent receiving control timing.

Shown in the uppermost row is the roll over for the PN short code and in the next row are slots for the paging channel. The roll over for the PN short code is a marker which is produced each time the sequence of the short code makes a round and in this case the marker is produced at the period of 26.667 msec. The slot for the paging channel has the length of 80 msec. equal to three periods of the roll over for the PN short code. In FIG. 2, only the slot assigned to its own station is shown. The repetition cycle of the slot in the slot mode is prescribed by 1.28 seconds multiplied by the n-th power of 2. The slot mode is disclosed in, for example, U.S. Pat. No. 5,596,571 in detail. It is important that the slot is produced in synchronism with the roll over for the PN short code of the base station. That is, with respect to the short code, the state vector of the PN code generator of the base station has always the same value at the head of the slot for the paging channel. The intermittent receiving control of the embodiment is repeated in four sections referred by t1 to t4 in synchronism with the slot cycle. The four sections are managed by the low-power timer means 51 and the high-accuracy timer means 44. The intermittent receiving control timing of the embodiment is now described while paying attention to the overflow signal (hereinafter referred to as 0V(•) of the two timer means 51 and 44.

In FIG. 2, occurrence of 0V(•) is indicated by a falling edge. When the timer means 51 and 44 are instructed to be started, the pertinent 0V(•) signal rises and when counting of a predetermined time is completed, the 0V(•) signal falls, so that the overflow signal 0V(•) is assumed to be generated.

First of all, the intermittent receiving control means 43 terminates the receiving state and supplies a start (s1) to the low-power timer means 51 to instruct it to begin the suspension state. The time of the suspension state is assumed to be t1. After the elapse of the time t1, the overflow signal 0V(s1) is notified to the intermittent receiving control means 43. In FIG. 2, the state continued after the 0V(s1) has been produced is shown. The relation upon the resumption of the receiving operation is now described in order.

The intermittent receiving control means 43 which has detected the 0V(s1) supplies a start (wu) to the low-power timer means 51 to instruct them to count a starting period t2 for the VC-TCXO1 and the like. In this connection, it is assumed that the timing accuracy of the low-power timer means 51 is inferior and the periods t1 and t2 contain errors T1 and T2, respectively. For example, when two seconds are counted with the timing accuracy of 50 ppm, a shift or deviation of about 123 chips (50 ppm×2×1.2288M) occurs since the chip rate of the base station is 1.2288 Mcps. In the embodiment, the suspension state t1 and the starting time t2 for power are controlled by the low-power timer means 51 and accordingly it is necessary to dissolve the shift or deviation of the chip every time.

When the time t2 elapses and the overflow signal 0V(wu) is detected, the intermittent receiving control means 43 supposes that the VC-TCXO 1 and the reference signal group generation unit 2 are stabilized and the control means 43 validates the high-accuracy timer means 44. At the same time, the intermittent receiving control means 43 produces a start (d) so that the high-accuracy timer means 44 counts a time t3 exceeding the calculation times for the re-synchronization for phase of code. When the overflow 0V(d) is produced by the high-accuracy timer means 44, the intermittent receiving control means 43 produces a start (r) so that the high-accuracy timer means 44 counts a time t4 calculated during the period t3. The time t4 is a value fetched by the intermittent receiving control means 43 from the reception time calculation means 49 during the period t3. The times t1, t2 and t3 are values defined as designed values while the time t4 is changed every setting in order to compensate variation of t1 and t2. As shown in FIG. 2, t1, t2 and t3 precede the slot position of the paging channel slot and t4 is adjusted to maintain the relation containing the slot. This mechanism or arrangement will be described later in detail. Further, the VC-TCXO 1 constituting the reference of the high-accuracy timer means 44 is calibrated to the accuracy of ppm smaller than a decimal point and accordingly a timing error for t3 and t4 of unit time is assumed to be negligible for the chip rate.

Next, when the high-accuracy timer means 44 counts the time t4 and produces an overflow 0V(r), the intermittent receiving control means 43 produces the start (s1) to instruct the low-power timer means 51 to count the time t1.

As the result of the foregoing operation, a series of intermittent receiving control timings t1 to t4 is repeated.

The intermittent receiving control operations started by the respective overflow signals are now described in detail.

Figure 3:
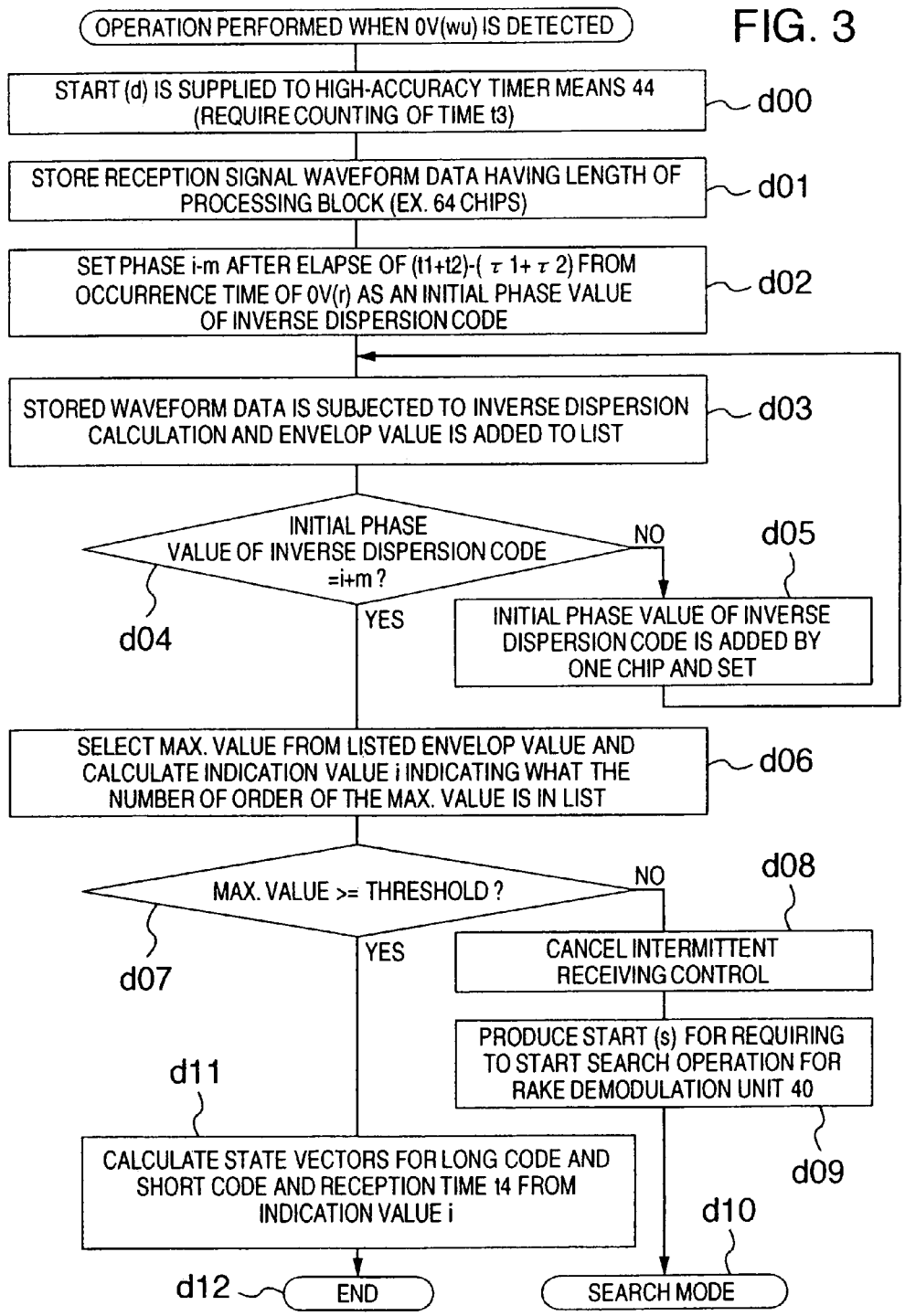
FIG. 3 is a flow chart showing operation performed when 0V (wu) is detected.

FIG. 3 is a flow chart showing operation performed when the signal 0V(wu) is detected.

The signal 0V(wu) is a notice assuring that the VC-TCXO 1, the reference signal group generation unit 2 and the receiving unit 3 have been started. The start (d) is supplied to the high accuracy timer means 44 in response to the notice to require counting of the time t3 (step d00). Then, waveform data of the received signal having a length of a processing block, in the embodiment 64 chips, for example, is stored in the waveform storage means 45 (step d01). The stored waveform data is used in the PN code phase calculation means 46 to calculate the code phase upon storing.

A phase i-m after the elapse of (t1+t2)−(T1+T2) from the occurrence time of the 0V(r) (indicating the end of the reception state) is set as an initial phase value of the despreading code of the PN code phase calculation means 46 (step d02).

The despreading code series (64 chips in the embodiment) produced successively from the initial phase value is used to cause the waveform data to be subjected to the despreading calculation and an envelope value thereof is added to the list (step d03). Next, it is examined whether the initial phase value of the despreading code is i+m corresponding to the time (t1+t2)+(T1+T2) or not (step d04). When the initial phase value is not i+m, a value corresponding to one chip is added to the initial phase value of the despreading code and the process is moved to the step d03 (step d05).

In step d04, when the initial phase value is i+m, the process proceeds to step d06. In step d06, a maximum value is selected from the listed envelope value and an indication value i indicating what the number of the maximum value is in the list is calculated. This indication value I is produced from the PN code phase calculation means 46.

Figure 4:
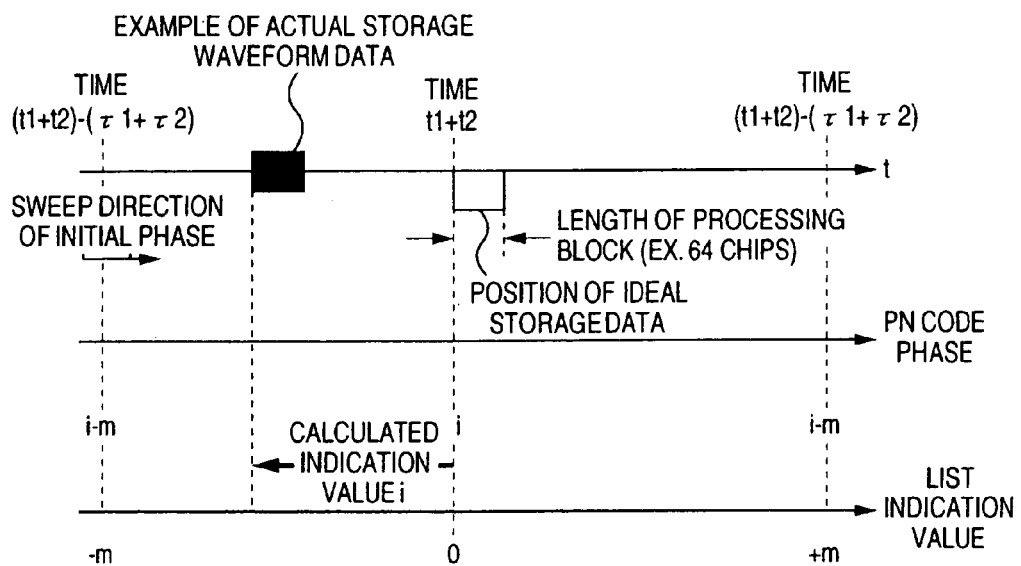
FIG. 4 illustrates the relation of variables.

The relation of the variables is now arranged. FIG. 4 is a diagram for explaining the relation of variables. The uppermost row indicates the elapse of time. The middle row indicates the phase of the PN code and the lowermost row indicates the position in the list in which the envelope value is stored. Primarily, when the timing error of the low-power timer means 51 is 0, the code phase of the received signal is advanced by a design value t1+t2 of the time elapsed. A code phase corresponding to a phase shift expected from the accuracy of the crystal oscillation element 50 used in the embodiment is provided in the terminal side. For example, a finite number of state vectors of the PN code generator giving a desired phase are provided. The loop operation in steps d03 to d05 sweeps the PN code phase at the middle row of FIG. 4 in the right direction with respect to the state vector. The list indication value has the maximum value set to ±m with the center value 0 at the position of time t1+t2 having an error of 0. As described in step d06, the calculated indication value i is produced in accordance with the phase of the actual waveform data.

Description is now returned to FIG. 3. In step d06, when there are a plurality of maximum values, the indication value having a small absolute value is selected. Next, in the embodiment, the reliability of the calculated PN code phase is examined.

It is judged whether the maximum value of the despread envelope is equal to or larger than a predetermined threshold or not (step d07). When the maximum value is smaller than the threshold, the intermittent receiving control is canceled (step d08) and a start (s) for requiring to start the search operation for the rake demodulation unit 40 is produced (step d09). The process in the embodiment proceeds to the search mode (d10). When the maximum value is equal to or larger than the threshold, the state vectors for the long code and the short code and the necessary reception time t4 after the elapse of the time t3 from the time 0V(wu) are calculated from the indication value i (step d11). When 0V(wu) is detected, the implemented processing is terminated (d12). The calculation processing performed in step d11 is described later in detail.

Figure 5:
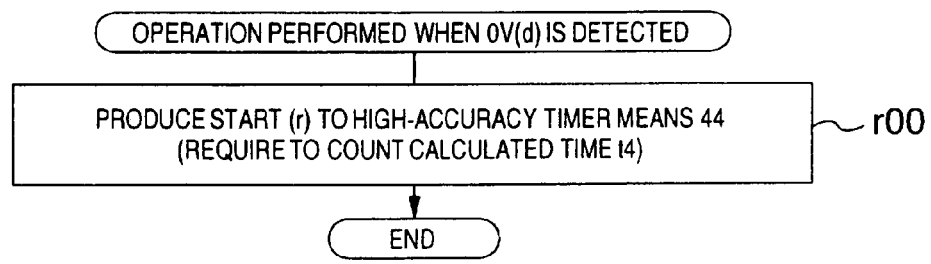
FIG. 5 is a flow chart showing operation performed when 0V (d) is detected.

Referring now to FIG. 5, the operation performed when 0V(d) is detected is described. 0V(d) is produced in response to the elapse of the time t3. When the intermittent receiving control means 43 detects 0V(d), the intermittent receiving control means 43 produces the start (r) for instructing the high-accuracy timer means 44 to count the time t4. The signal 0V(d) is also supplied to the rake demodulation unit 40, the demultiplexing separation unit 41 and the descrambler unit 42 to instruct them to start the demodulation operation. At this time, the PN-code-for-short-code generator used in the rake demodulation unit 40 starts from the state vector value calculated in the period t3. The PN-code-for-long-code for the descrambler unit 42 also starts from the long code state vector value calculated in the period t3.

Figure 6:
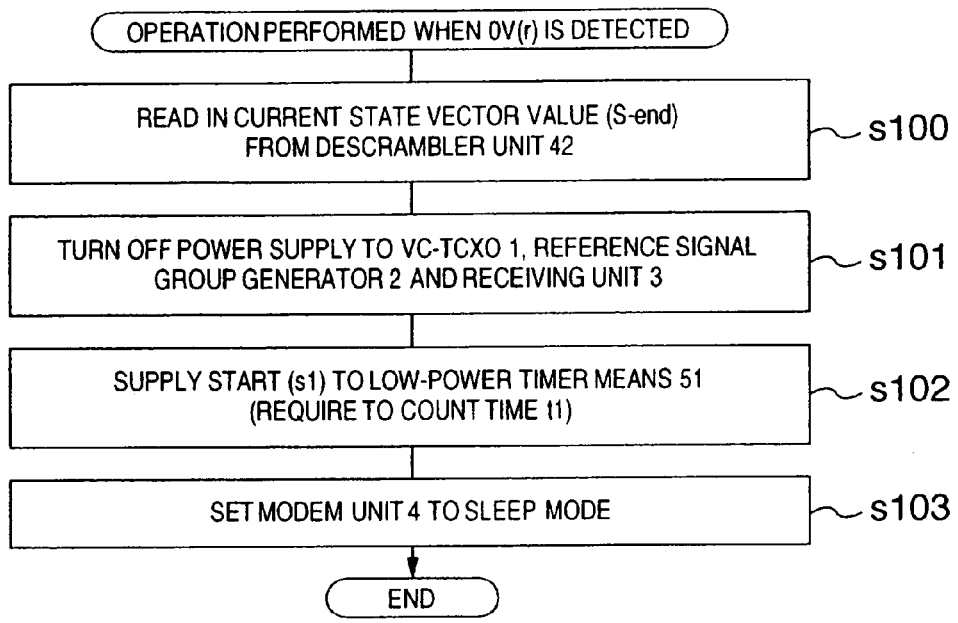
FIG. 6 is a flow chart showing operation performed when 0V (r) is detected.

Referring now to FIG. 6, the operation performed when 0V(r) is detected is described.

0V(r) is produced in response to the elapse of the reception time t4. When the intermittent receiving control means 43 detects the 0V(r), the current state vector value (S_end) of the PN-code-for-long-code generator is read in from the descrambler 42 (step s100). This value is used when the state vector upon resumption of the receiving operation is calculated next time. Next, the power supply to the VC-TCXO 1, the reference signal group generation unit 2 and the receiving unit 3 is turned off (step s101). The intermittent receiving control means 43 supplies the start (s1) to the low-power timer means 51 to instruct to count the suspension period t1 (step s102) and sets the modem unit 4 including the intermittent receiving control means 43 itself to a sleep mode (step s103) to terminate the processing.

Figure 7:
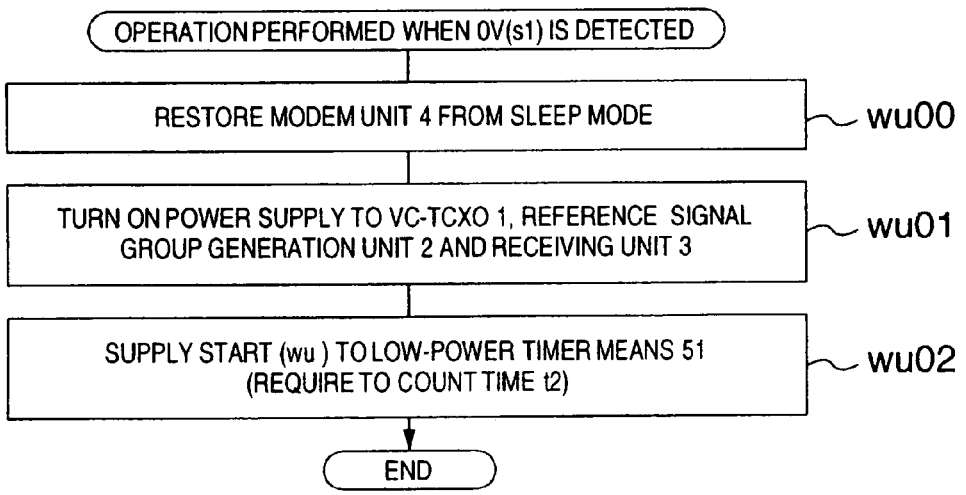
FIG. 7 is a flow chart showing operation performed when 0V (s1) is detected.

Referring now to FIG. 7, the operation performed when 0V(s1) is detected is described. When the intermittent receiving control means 43 detects 0V(s1) even in the sleep mode, the control means 43 releases the modem unit 4 from the sleep state (step wu00). However, the rake demodulation unit 40, the demultiplexing unit 41 and the descrambler unit 42 do not resume the demodulation operation. The resumption thereof is made in response to the output of 0V(d). Next, the power supply to the VC-TCXO 1, the reference signal group generation unit 2 and the receiving unit 3 is turned on (step wu01). In order to ensure the time that the states of the portions started are stabilized, the start signal (wu) for instructing to count the time t2 is supplied to the low-power timer means 51 (step wu02) and the processing is terminated. The foregoing is the description about the operation relative to the intermittent receiving control timing.

Figure 8:
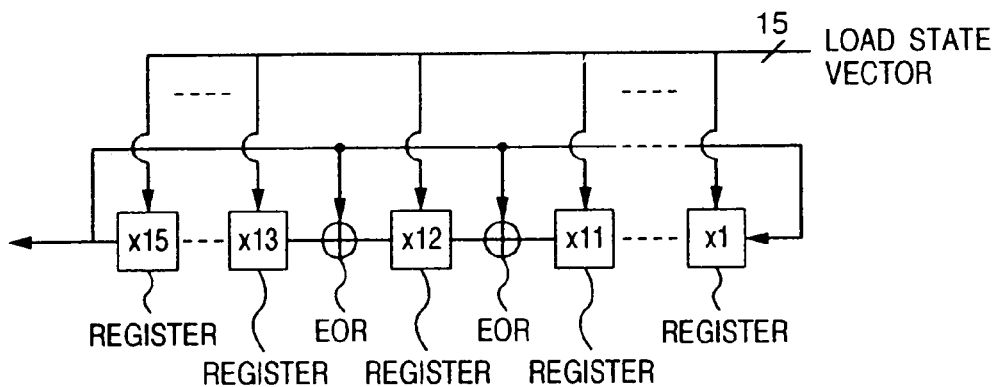
FIG. 8 is a schematic diagram for explaining a structure of a linear feedback shift register (15 stages for short code)

A calculation method of the state vector and the reception time in the embodiment is now described. First, the state vector is described. FIG. 8 is a schematic diagram illustrating a linear feedback shift register which is a basic element of the PN code generator. An example of the linear feedback shift register includes exclusive OR gates inserted between registers. A maximum delayed output is fed back to the exclusive OR gates and the first register and the insertion position of the exclusive OR gate is determined in accordance with a characteristic polynomial expression of the series to be produced. The period of the series produced by the n-degree characteristic polynomial expression is $2^n-1$. The short code is the series that a zero (0) is inserted in the output when 14 continuing zeros (0) appearing uniquely in the series of one period are detected and has the period of $2^{15}$. It can be structured by setting the number of stages of registers in the linear feedback shift register shown in FIG. 8 to 15 stages and adding a zero (0) insertion circuit (not shown). A vector using the value of this register as a column vector is assumed to be the state vector. The state vector of the PN code generator used in the receiver of the embodiment can be set to any value in accordance with a load input as shown in FIG. 8.

Figure 9:
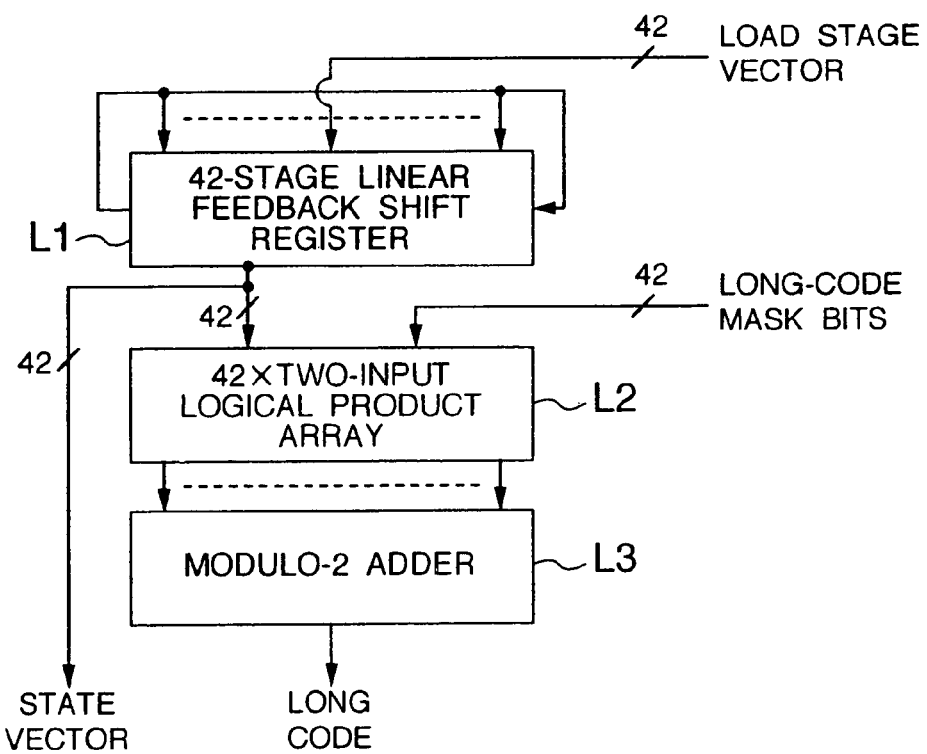
FIG. 9 is a schematic diagram illustrating a PN-code-for-long-code generator.

Referring now to FIG. 9, a structure of the PN-code-for-long-code generator used in scramble and descramble is described. In FIG. 9, L1 represents a 42-stage linear feedback shift register, L2 a 42×two-input AND array, and L3 a 42-input modulo-2 adder. The 42-stage linear feedback shift register L1 can be supplied with a load input so that its state can be set to any state. The PN code for long code is a series obtained by performing logical product operation or AND operation for each stage between the state vector of the 42-stage linear feedback shift register and a bit string named long-code mask bits and adding 42 outputs thereof with modulo 2. The long-code output is produced by the modulo-2 adder L3. There is a function for time-shifting the output series of the linear feedback shift register by setting of the long-code mask bits.

In the structure shown in FIG. 9, the period of the code is the forty second power of 2 and is particularly long as compared with the short code.

Figure 10:
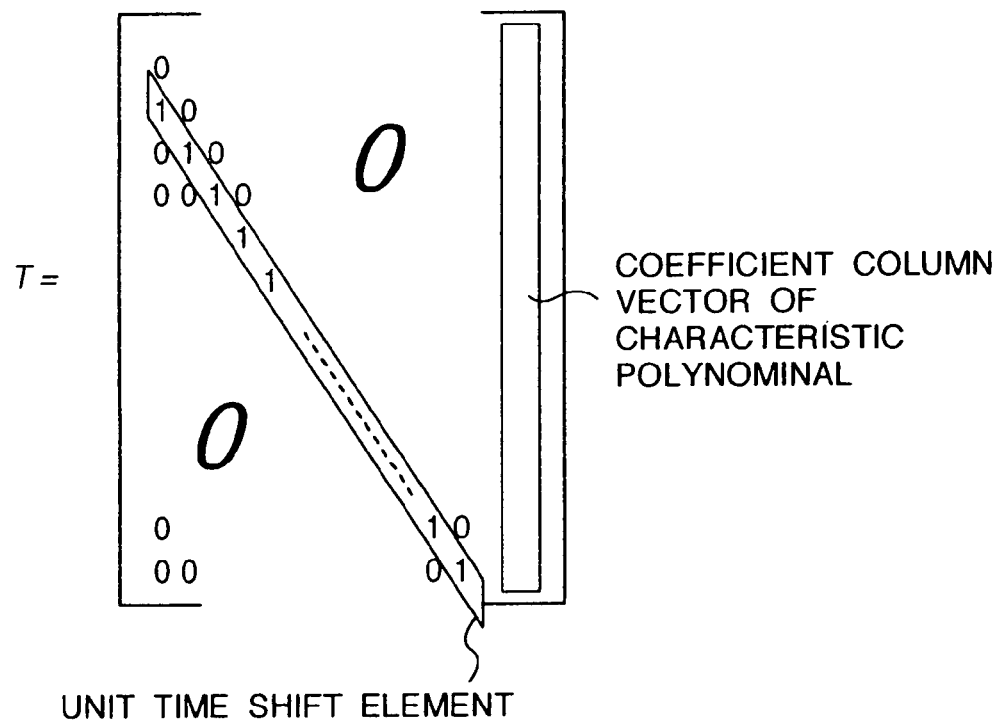
FIG. 10 shows an example of a linear feedback shift register expressed by a transition matrix (corresponding to a structure of FIG. 11)

The state transition of the linear feedback register shown in FIGS. 8 and 9 can be expressed by a transition vector T as shown in FIG. 10. The vector T reflects the structure of FIG. 8. In the vector T, a coefficient column vector of the characteristic expression and diagonal elements for performing unit time shift operation are important and other portions are 0. In order to calculate a state (B) shifted by j steps from a certain state (A), a matrix obtained by raising the vector T to the j-th power is multiplied by a column vector of the state (A). In the short code, it is necessary to make adjustment by inserting 0 so that the period is equal to the 15th power of 2. In the long code, however, the matrix to be prepared is 42×42 and it can be calculated as it is. In the embodiment, the matrix to be used is designated by the indication value i calculated by the PN code calculation means 46. The matrix for a deviation width of the timing accuracy of the low-power timer means 51 is calculated previously to be prepared.

Next, the reception time t4 is calculated by first defining a standard value and correcting the standard value by the indication value i produced by PN code phase calculation means 46. The standard value is defined to contain a delay time since the reception slot is received fully and then the demodulation and decoding processing thereof is all completed. When the timing error of the low-power timer means 51 and the high-accuracy timer means 44 is assumed to be 0, the standard value is defined as follows:

$$\text{Standard Value} = \text{Slot Cycle Period} - t1 - t2 - t3$$

When t1+t2 by the timer means 51 is shorter than the design value, by the indication value i, correction is made so that t4 is extended correspondingly. The correction is calculated by the reception time calculation means 49. As the result, a time difference between the output timing of the overflow 0V(r) by the elapse of t4 and the end time of the paging channel slot from the base station is fixed. Since the paging channel slot is synchronized with the roll over of the PN short code, the state vector of the short code upon output of the 0V(r) has a fixed value and can be calculated previously. The state vectors for the known I and Q signals are hereinafter referred to as S_i and S_q, respectively.

Figure 11:
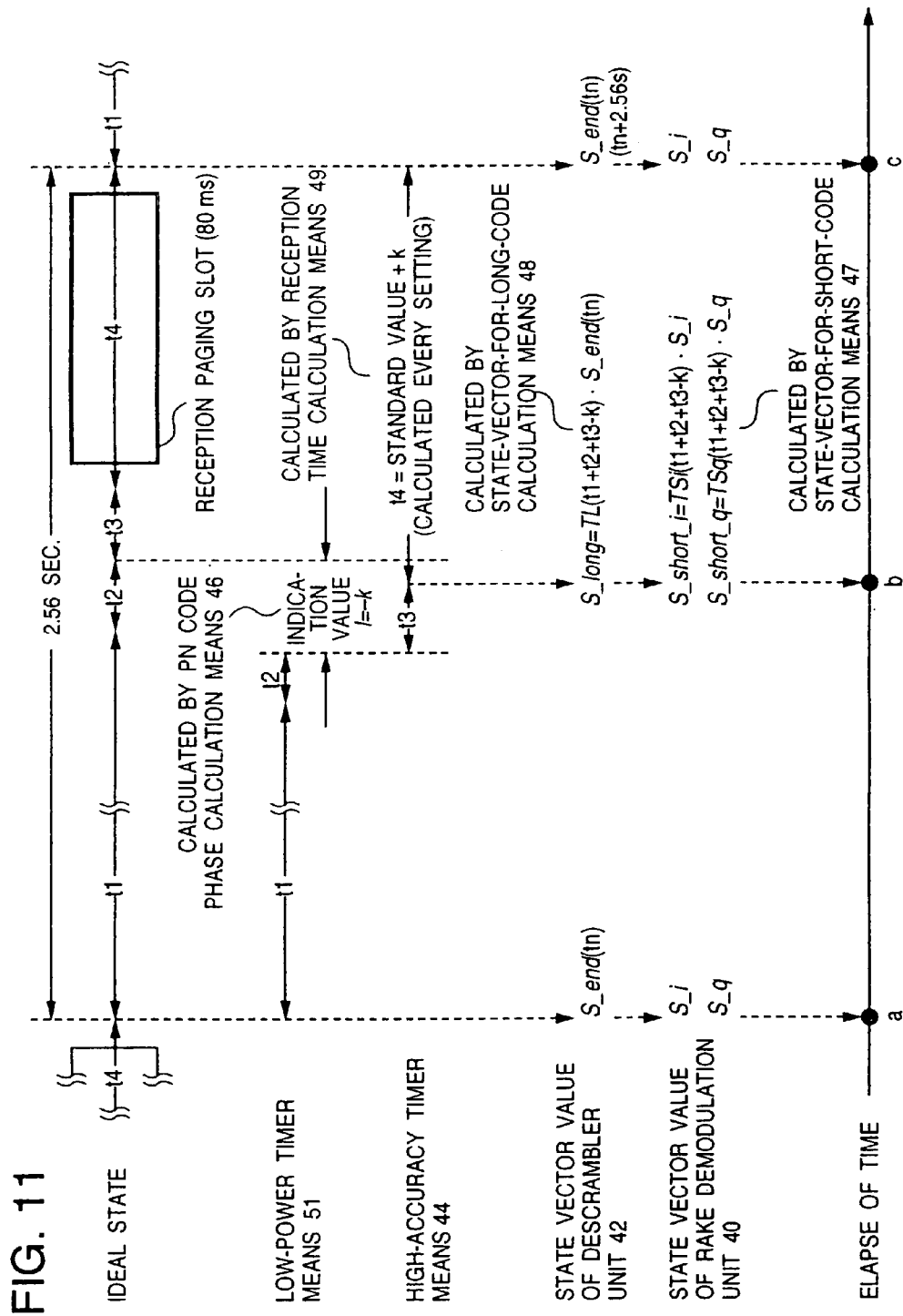
FIG. 11 illustrates the relation among calculation values based on an indication value i.

Referring now to FIG. 11, the relation of the calculation values based on the indication value i is arranged.

The uppermost row of FIG. 11 represents an ideal state having the timing errors of 0 for t1, t2 and t3. The value t4 at this time is a standard value. The slot cycle is set to 2.56 seconds. The second row from the uppermost row represents an actual example of counting of t1 and t2 by the low-power timer means 51 and the third row represents an actual example of counting by the high-accuracy timer means 44. In FIG. 11, the periods t1 and t2 by the low-power timer means 51 are short and counting of t3 by the high-accuracy timer means 44 is started earlier than the ideal state, so that t4 is prolonged considerably. As shown in FIG. 11, when it is assumed that the indication value i calculated by the PN code phase calculation means 46 is equal to −k (i=−k), the time t4 is calculated to t4=the standard value +k by the reception time calculation means 49. In FIG. 11, there are further shown the state vector value of the PN-code-for-long-code generator of the descrambler unit 42 and the state vector value of the PN-code-for-short-code of the rake demodulation unit 40. The lowermost row of FIG. 11 represents an elapse of time. Noticeable points are a time a after the elapse of the first time t4, a time b after the elapse of t3 counted by the high-accuracy timer means 44 and a time c after the elapse of t4. The state vector of the descrambler unit 42 at the time a is expressed as S_end(tn). Further, the state vectors of the rake demodulation unit 40 are the fixed values S_i and S_q at the time a as described above.

In the embodiment, the state vector for long code S_long and the state vectors for short code S_short_i and S_short_q at the time b are calculated by the state-vector-for-long-code calculation means 48 and the state-vector-for-short-code calculation means 47, respectively, from the indication value i=−k within the period t3. When the transition matrix for long code is expressed as TL(•) and the transition matrixs for short code are expressed as Tsi(•) and TSq(•) to express the transition matrix corresponding to the elapse of time within (•), the state vectors can be calculated by the following expressions.

$$S\_long = TL(t1+t2+t3-k) \cdot S\_end(tn) \qquad \text{(expression 1)}$$

$$S\_short\_i = TSi(t1+t2+t3-k) \cdot S\_I \qquad \text{(expression 2)}$$

$$S\_short\_q = TSq(t1+t2+t3-k) \cdot S\_q \qquad \text{(expression 3)}$$

The calculated state vectors are used to start the demodulation operation from the time b. The state vector of the descrambler unit 42 at the time c is a value elapsed by the slot cycle time from S_end(tn) and the state vectors of the rake demodulation unit 40 are S_i and S_q again.

Figure 12:
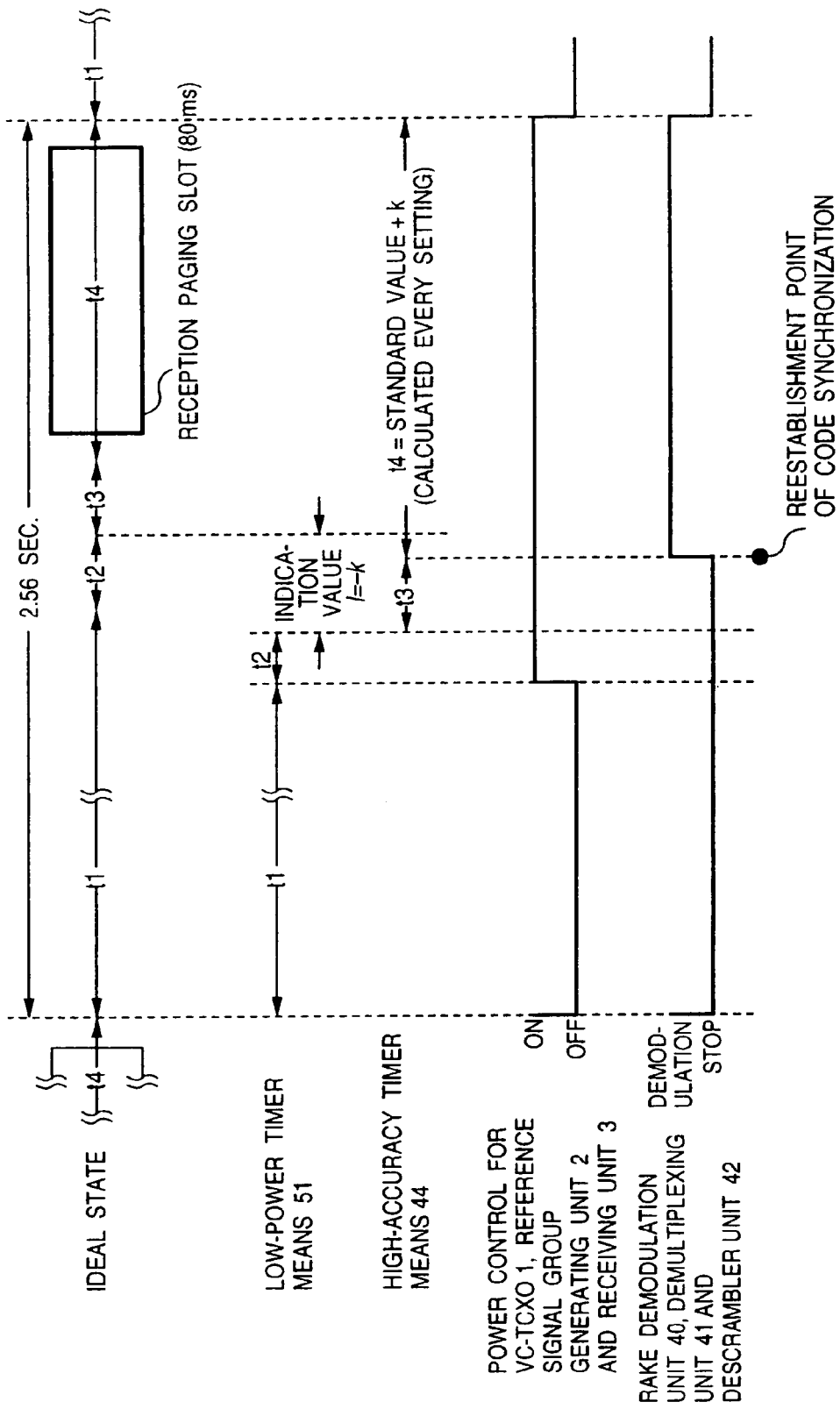
FIG. 12 illustrates control of a power supply in the receiver according to the embodiment of the present invention.

The power supply control in the receiver of the embodiment corresponding to FIG. 11 is shown in FIG. 12. As described above, the power supply to the VC-TCXO 1, the reference signal group generation unit 2 and the receiving unit 3 is turned off during the period t1 and is turned on during the periods t2, t3 and t4. Further, operation of the rake demodulation unit 40, the multiplexing separation unit 41 and the descrambler unit 42 is stopped during the periods t1, t2 and t3 and the demodulation operation is made only during the period t4. Most of the time rate is assigned to the period t1 which is in the suspension state, so that only the low-power timer means 51 is operated during the period t1 to thereby be able to reduce the average power consumption.

Figure 13:
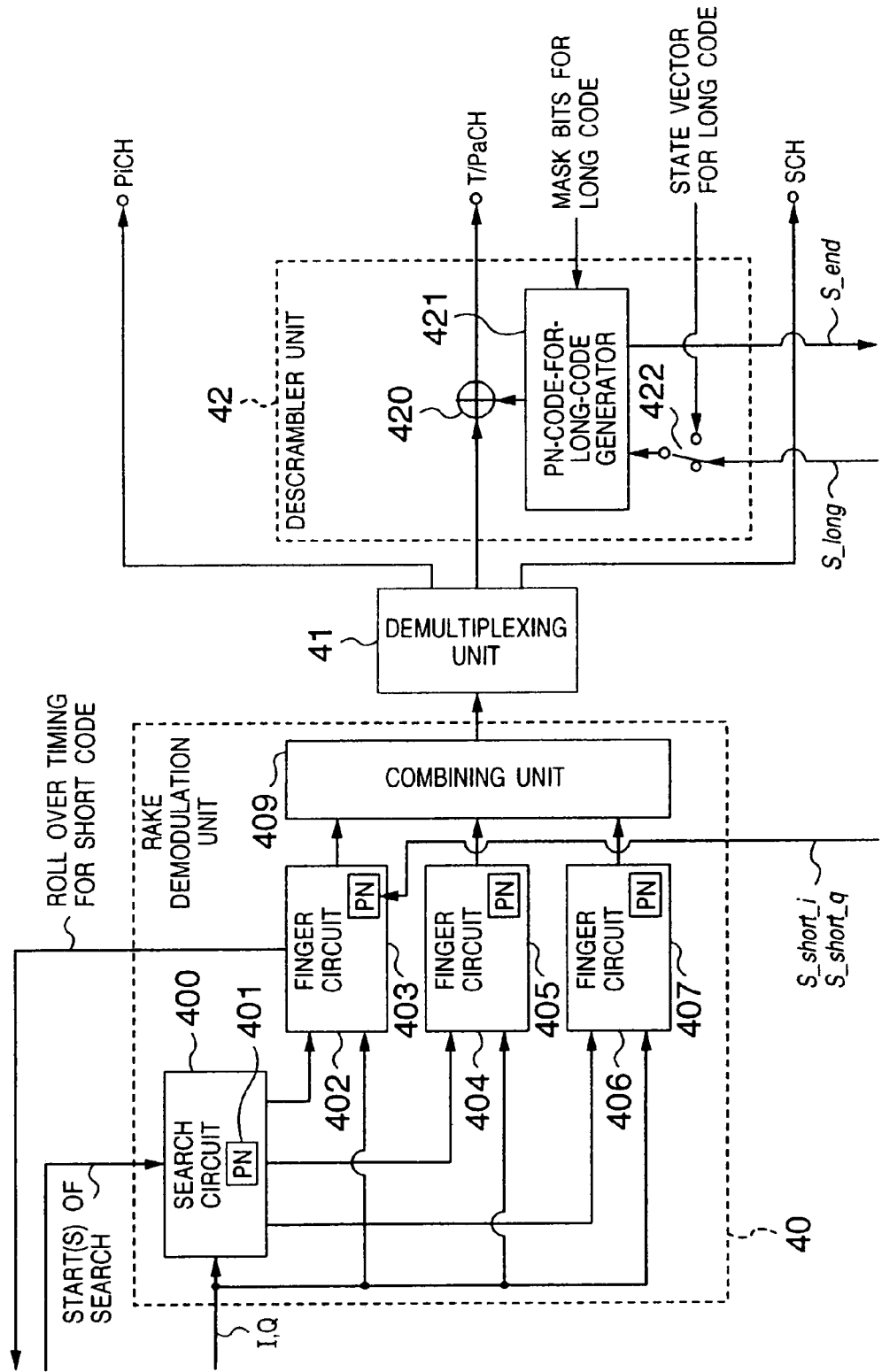
FIG. 13 schematically illustrates the internal configuration of a rake demodulator 40 and a descrambler unit 42.
Figure 14:
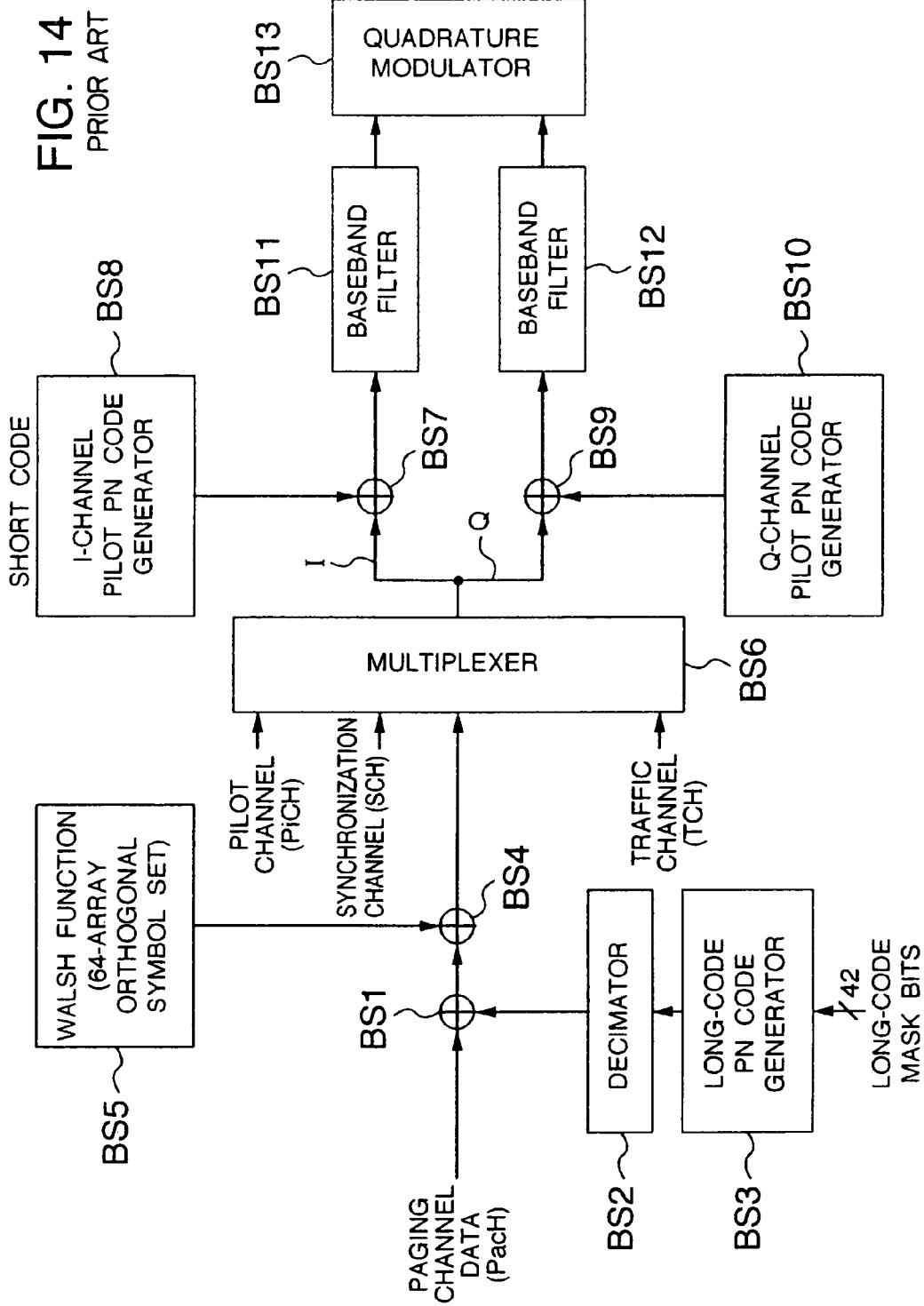
FIG. 14 is a schematic diagram illustrating the transmitter of the base station.

Referring now to FIG. 13, the internal structure of the rake demodulation unit 40, the multiplexing separation unit 41 and the descrambler unit 42 is described. In FIG. 13, numeral 400 denotes a search circuit, 401, 403, 405 and 407 PN-code-for-short-code generating units, 402, 404 and 406 finger circuits, 409 a combining circuit, 420 an exclusive OR gate, 421a PN-code-for-long-code generation unit having the internal structure shown in FIG. 9, and 422 a data selector. The I- and Q-signals inputted to the rake demodulation unit 40 are supplied to the search circuit 400 and the finger circuits 402, 404 and 406. The search circuit 400 including a PN-code-for-short-code generation unit 401 searches for a multi-path signal and supplies code phase information of paths to the finger circuits 402, 404 and 406. The finger circuits 402, 404 and 406 including the dedicated PN code generation units 403, 405 and 407, respectively perform tracking independently of paths and demodulation. The combining circuit 409 combines skews of demodulated outputs of each of the finger circuits 402, 404 and 406 and performs the path combining diversity to be supplied to the demultiplexing unit 41. The traffic channel (TCH) or the paging channel (PaCH) produced by the multiplexing separation unit 41 is descrambled in the exclusive OR gate 420 by means of the long code produced by the PN-code-for-long-code generation unit 421. In addition to the structure for the normal receiving operation, in the embodiment, the following connection is added for the purpose of the intermittent receiving operation.

The search start (s) from the intermittent receiving control means 43 is supplied to the search circuit 400 and the state vectors S_short_i and S_short_q are supplied as load values of the state vectors to the PN-code-for-short-code generation unit 403 included in the finger circuit 402. Further, the roll over timing for short code from the finger circuit 402 is supplied to the intermittent receiving control means 43. The intermittent receiving control means 43 is supplied with the roll over timing for short code during continuous receiving operation to use it as a reference for changing the continuous receiving state to the intermittent receiving state. Further, the finger circuit 402 starts demodulation by using the calculated state vector upon the intermittent receiving operation.

On the other hand, the state vector of the PN-code-for-long-code generation unit 421 is set through the data selector 422. Normally, the synchronization channel (SCH) is decoded to calculate the set value, while in the intermittent receiving operation the data selector 422 is changed to select the state vector S_long produced by the state-vector-for-long-code calculation means 48. Further, the value of the state vector for long code is outputted as S_end.

The demodulation operation corresponding to the intermittent receiving control is performed with the internal structure of the rake demodulation unit 40, the demultiplexing unit 41 and the descrambler unit 42.

As described above, according to the embodiment, not only the receiving unit 3 and the modem unit 4 but also the VC-TCXO 1 constituting the reference oscillation means with high accuracy can be suspended during the suspension state. This reason is that even if the low-power timer means 51 having inferior accuracy is used to control the suspension state roughly, the phase of code is calculated in the range of shifted or deviated phase expected upon resumption of the receiving operation by means of the numerical calculation and the state vector at the time of starting the demodulation can be set by means of the newly started high-accuracy timer means 44. Further, the reason why the deviation of phase can be limited within the expected range is that the reception time containing the paging channel slot is adjusted every slot cycle to compensate the error at the time of timing the suspension state. In addition, the reliability of the calculated result of the code phase is evaluated and when the reliability is reduced depending on a situation of a propagation path, the search operation is started immediately and accordingly return to the normal state is performed rapidly.

Finally, the basic principle of the present invention is arranged. FIG. 15 is a schematic diagram illustrating the basic principle of the present invention. In FIG. 15, 3D represents a receiving unit for receiving a radio signal and producing the orthogonally detected I- and Q-signals, 4D a demodulation unit for performing the rake demodulation, the multiplexing separation and the descrambling processing, 43D an intermittent receiving control means, 51D a first timer means, 44a a second timer means, 44b a third timer means, and 478 a state vector calculation means. Other elements identical with those of FIG. 1 are designated by like references. Moreover, the waveform storage means 45, the PN code phase calculation means 46, the reception time calculation means 49 and the state vector calculation means 478 are operated under control of the intermittent receiving control means 43D. In FIG. 15, however, control signals are omitted and not shown.

The I- and Q-signals outputted by the receiving unit 3D are supplied to the demodulation unit 4D and the waveform storage means 45. The demodulation unit 4D demodulates the I- and Q-signal to obtain the received data. The demodulation unit 4D can set the state vector of the PN code generator for despreading not shown externally. Control of turning on and off of the power supply to the receiving unit 3D and turning on and off of demodulation of the demodulation unit 4D is made by the signals from the intermittent receiving control means 43D independently. In the present invention, in order to control the operation timing of the intermittent receiving operation, at least three timer means including the first timer means 51D having low power and low accuracy and for controlling the suspension time, the second timer means 44a for controlling the restart time of demodulation with high accuracy, and the third timer means 44b for controlling the demodulation continuation time similarly are connected to the intermittent receiving control means 43D. While the first timer means for controlling the suspension time is being operated, the demodulation unit 4D, the second and third timer means are suspended to reduce the power consumption during the suspension period. When the intermittent receiving control means 43D detects that the suspension period by the first timer means is completed, the intermittent receiving control means 43D utilizes the second timer means 44b to resume the demodulation operation. At this time, it is necessary to attain the PN code synchronization in the demodulation unit 4D again and the waveform storage means 45, the PN code phase calculation means 46 and the state vector calculation means 478 are used for the purpose thereof. The PN code phase calculation means 46 uses the waveform data having a processing block length obtained by the waveform storage means 45 simultaneously with the start of the second timer means to calculate its code phase. The state vector at the time of end of timing by the second timer means is calculated in the state vector calculation means 478 on the basis of the calculated result. The intermittent receiving control means 43D sets the calculated state vector to the demodulation unit 4D and resumes the demodulation operation of the demodulation unit 4D simultaneously with the end of timing by the second timer means. Further, in order to compensate time variation of the suspension period, the demodulation continuation time is lengthened as compared with the design value on the basis of the result of the PN phase calculation means 46 and a suitable value is added to or subtracted from a predetermined demodulation continuation time. This calculation is made in the reception time calculation means 49 while the second timer performs the timing operation. The calculated continuation time information is set to the third timer means 44b through the intermittent receiving control means. When the demodulation continuation time controlled by the third timer is terminated, the intermittent receiving control means 43D starts the first timer means again to shift to the suspension state. The forgoing is the basic principle of the present invention.

What is claimed:

1. A mobile communication terminal, comprising:
   a receiver which receives a spread spectrum signal transmitted by a base station;
   a demodulator which generates a dispreading code for de-spreading the spread spectrum signal received by the receiver and demodulates the spread spectrum signal using the generated dispreading code;
   a first oscillator which outputs a first frequency signal, wherein the first frequency signal is a signal having a first frequency;
   a second oscillator which starts to output a second frequency signal when the receiver changes from a suspension state to a receiving state,
   wherein the second frequency signal is a signal having a second frequency, and
   wherein an accuracy of a timing implemented based on the second frequency signal is higher than an accuracy of a timing implemented based on the first frequency signal; and
   a controller which executes an intermittent receiving operation in which the receiver changes from the suspension state to the receiving state based on a repetition cycle of a slot assigned to the mobile communication terminal,
   wherein the controller controls so that the receiver changes from the suspension state to the receiving state and the demodulator starts demodulation operation using the second frequency signal, and controls to maintain the intermittent receiving operation if an output of a signal demodulated by the demodulator is equal to or larger than a predetermined value, and controls to cancel the intermittent receiving operation if the output of the signal is smaller than the predetermined value.

2. The mobile communication terminal according to claim 1, wherein the repetition cycle of the slot is prescribed by 1.28 seconds multiplied by the nth power of 2.

* * * * *